Jan. 4, 1966 G. L. SHELTON, JR 3,227,034
SPECIMEN IDENTIFICATION APPARATUS UTILIZING AN ELLIPTICALLY
POLARIZED OPTICAL AUTOCORRELATION FUNCTION
Filed Oct. 5, 1961 6 Sheets-Sheet 1

INVENTOR
GLENMORE L. SHELTON, JR.
BY Sughrue, Rothwell, Mion and Zinn
ATTORNEYS.

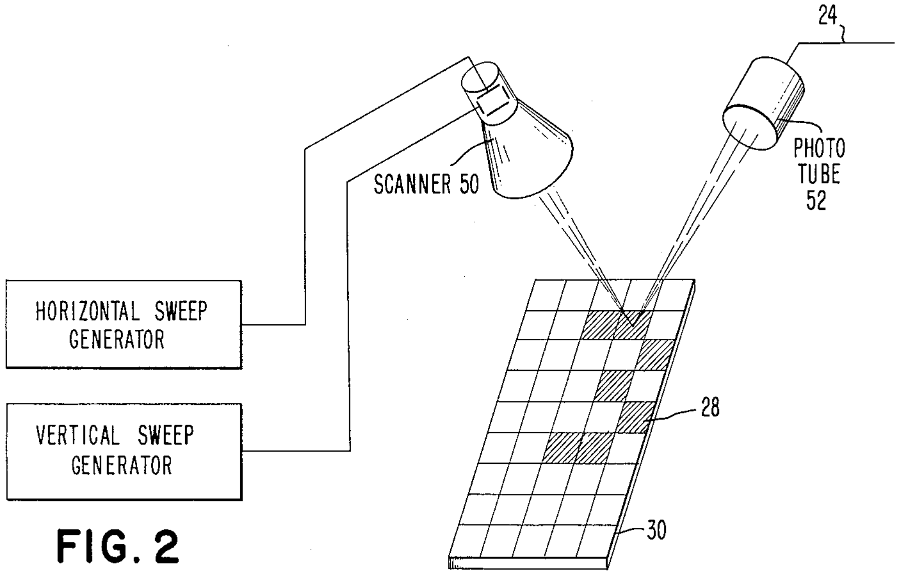
FIG. 2
FIG. 3a
| | | | | |
|---|---|---|---|---|
| 0 | 1 | 2 | 1 | 0 |
| 1 | 1 | 0 | 1 | 1 |
| 0 | 1 | 3 | 1 | 0 |
| 1 | 2 | 0 | 2 | 1 |
| 0 | 2 | 7 | 2 | 0 |
| 1 | 2 | 0 | 2 | 1 |
| 0 | 1 | 0 | 1 | 0 |
| 1 | 1 | 0 | 1 | 1 |
| 0 | 1 | 2 | 1 | 0 |
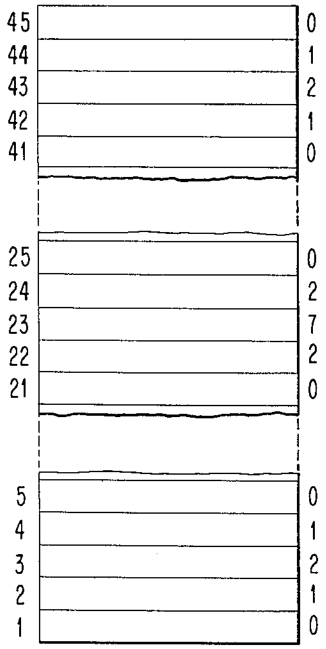
FIG. 3b PATTERN f(x,y) — AUTOCORRELATION FUNCTION $D_R(x',y')$ — NORMALIZED AUTOCORRELATION FUNCTION $Z_R(x',y')$

| | | | | |
|---|---|---|---|---|
| | | 5 | 0 | 0 |
| 0 | 0 | 4 | 0 | 0 |
| 0 | 0 | 3 | 0 | 0 |
| 0 | 0 | 2 | 0 | 0 |
| 0 | 0 | 1 | 0 | 0 |

| | | | | |
|---|---|---|---|---|
| | | 0.5423 | 0 | 0 |
| 0 | 0 | 0.4339 | 0 | 0 |
| 0 | 0 | 0.3254 | 0 | 0 |
| 0 | 0 | 0.2169 | 0 | 0 |
| 0 | 0 | 0.1085 | 0 | 0 |

| | | | | |
|---|---|---|---|---|
| | | 8 | 2 | 2 |
| 0 | 3 | 2 | 2 | 1 |
| 1 | 2 | 1 | 2 | 0 |
| 1 | 1 | 3 | 1 | 1 |
| 0 | 1 | 1 | 1 | 0 |

| | | | | |
|---|---|---|---|---|
| | | 0.6172 | 0.1543 | 0.1543 |
| 0 | 0.2315 | 0.1543 | 0.1543 | 0.0772 |
| 0.0772 | 0.1543 | 0.0772 | 0.1543 | 0 |
| 0.0772 | 0.0772 | 0.2315 | 0.0772 | 0.0772 |
| 0 | 0.0772 | 0.0772 | 0.0772 | 0 |

| | | | | |
|---|---|---|---|---|
| | | 7 | 2 | 0 |
| 1 | 2 | 0 | 2 | 1 |
| 0 | 1 | 3 | 1 | 0 |
| 1 | 1 | 0 | 1 | 1 |
| 0 | 1 | 2 | 1 | 0 |

| | | | | |
|---|---|---|---|---|
| | | 0.6417 | 0.1833 | 0 |
| 0.0917 | 0.1833 | 0 | 0.1833 | 0.0917 |
| 0 | 0.0917 | 0.2750 | 0.0917 | 0 |
| 0.0917 | 0.0917 | 0 | 0.0917 | 0.0917 |
| 0 | 0.0917 | 0.1833 | 0.0917 | 0 |

| | | | | |
|---|---|---|---|---|
| | | 8 | 3 | 1 |
| 1 | 3 | 5 | 2 | 1 |
| 1 | 1 | 3 | 2 | 1 |
| 0 | 0 | 2 | 1 | 0 |
| 0 | 0 | 1 | 0 | 0 |

| | | | | |
|---|---|---|---|---|
| | | 0.5547 | 0.2080 | 0.0693 |
| 0.0693 | 0.2080 | 0.3467 | 0.1387 | 0.0693 |
| 0.0693 | 0.0693 | 0.2080 | 0.1387 | 0.0693 |
| 0 | 0 | 0.1387 | 0.0693 | 0 |
| 0 | 0 | 0.0693 | 0 | 0 |

| | | | | |
|---|---|---|---|---|
| | | 9 | 4 | 1 |
| 2 | 2 | 2 | 2 | 1 |
| 1 | 3 | 4 | 2 | 1 |
| 0 | 0 | 2 | 2 | 1 |
| 1 | 2 | 2 | 1 | 0 |

| | | | | |
|---|---|---|---|---|
| | | 0.5704 | 0.2535 | 0.0634 |
| 0.1267 | 0.1267 | 0.1267 | 0.1267 | 0.0634 |
| 0.0634 | 0.1901 | 0.2535 | 0.1267 | 0.0634 |
| 0 | 0 | 0.1267 | 0.1267 | 0.0634 |
| 0.0634 | 0.1267 | 0.1267 | 0.0634 | 0 |

PATTERN f(x,y) — AUTOCORRELATION FUNCTION $D_R(x',y')$ — NORMALIZED AUTOCORRELATION FUNCTION $Z_R(x',y')$

| | | | | |
|---|---|---|---|---|
| | | 9 | 3 | 2 |
| 1 | 4 | 4 | 2 | 2 |
| 1 | 3 | 2 | 3 | 1 |
| 1 | 1 | 2 | 1 | 0 |
| 1 | 1 | 1 | 0 | 0 |

| | | | | |
|---|---|---|---|---|
| | | 0.5614 | 0.1871 | 0.1248 |
| 0.0624 | 0.2495 | 0.2495 | 0.1248 | 0.1248 |
| 0.0624 | 0.1871 | 0.1248 | 0.1871 | 0.0624 |
| 0.0624 | 0.0624 | 0.1248 | 0.0624 | 0 |
| 0.0624 | 0.0624 | 0.0624 | 0 | 0 |

| | | | | |
|---|---|---|---|---|
| | | 7 | 2 | 1 |
| 0 | 1 | 3 | 1 | 1 |
| 0 | 2 | 2 | 1 | 0 |
| 0 | 2 | 1 | 1 | 0 |
| 0 | 1 | 1 | 1 | 0 |

| | | | | |
|---|---|---|---|---|
| | | 0.6417 | 0.1833 | 0.0917 |
| 0 | 0.0917 | 0.2750 | 0.0917 | 0.0917 |
| 0 | 0.1833 | 0.1833 | 0.0917 | 0 |
| 0 | 0.1833 | 0.0917 | 0.0917 | 0 |
| 0 | 0.0917 | 0.0917 | 0.0917 | 0 |

| | | | | |
|---|---|---|---|---|
| | | 11 | 4 | 4 |
| 2 | 4 | 4 | 4 | 2 |
| 1 | 2 | 4 | 2 | 1 |
| 2 | 2 | 4 | 2 | 2 |
| 1 | 2 | 3 | 2 | 1 |

| | | | | |
|---|---|---|---|---|
| | | 0.5180 | 0.1884 | 0.1884 |
| 0.0942 | 0.1884 | 0.1884 | 0.1884 | 0.0942 |
| 0.0471 | 0.0942 | 0.1884 | 0.0942 | 0.0471 |
| 0.0942 | 0.0942 | 0.1884 | 0.0942 | 0.0942 |
| 0.0471 | 0.0942 | 0.1413 | 0.0942 | 0.0471 |

| | | | | |
|---|---|---|---|---|
| | | 10 | 4 | 3 |
| 2 | 2 | 6 | 3 | 3 |
| 1 | 2 | 5 | 3 | 3 |
| 0 | 0 | 2 | 1 | 2 |
| 0 | 0 | 1 | 1 | 1 |

| | | | | |
|---|---|---|---|---|
| | | 0.5038 | 0.2015 | 0.1511 |
| 0.1008 | 0.1008 | 0.3023 | 0.1511 | 0.1511 |
| 0.0504 | 0.1008 | 0.2519 | 0.1511 | 0.1511 |
| 0 | 0 | 0.1008 | 0.0504 | 0.1008 |
| 0 | 0 | 0.0504 | 0.0504 | 0.0504 |

| | | | | |
|---|---|---|---|---|
| | | 8 | 0 | 3 |
| 2 | 2 | 4 | 2 | 2 |
| 1 | 2 | 2 | 2 | 1 |
| 0 | 2 | 0 | 2 | 0 |
| 0 | 0 | 1 | 0 | 0 |

| | | | | |
|---|---|---|---|---|
| | | 0.5774 | 0 | 0.2165 |
| 0.1443 | 0.1443 | 0.2887 | 0.1443 | 0.1443 |
| 0.0722 | 0.1443 | 0.1443 | 0.1443 | 0.0722 |
| 0 | 0.1443 | 0 | 0.1443 | 0 |
| 0 | 0 | 0.0722 | 0 | 0 |

Jan. 4, 1966 G. L. SHELTON, JR 3,227,034

SPECIMEN IDENTIFICATION APPARATUS UTILIZING AN ELLIPTICALLY POLARIZED OPTICAL AUTOCORRELATION FUNCTION

Filed Oct. 5, 1961 6 Sheets-Sheet 6

3,227,034

SPECIMEN IDENTIFICATION APPARATUS UTILIZING AN ELLIPTICALLY POLARIZED OPTICAL AUTOCORRELATION FUNCTION

Glenmore L. Shelton, Jr., Carmel, N.Y., assignor to International Business Machines Corporation, New York, N.Y., a corporation of New York Filed Oct. 5, 1961, Ser. No. 143,181
14 Claims. (Cl. 88—1)

This invention relates generally to specimen identification apparatus and, more particularly, to specimen identification apparatus wherein optical autocorrelation functions are utilized to identify the specimen.

Prior art specimen identification devices generally utilize direct comparison of the specimen and reference patterns. In such devices either vertical or horizontal misregistration of the specimen affects the comparison and, furthermore, the document containing the specimen, such as a character, must be held in a fixed position during the identification.

The present invention utilizes autocorrelation function comparison for specimen identification. The autocorrelation function of a function provides a measure of the correlation of the function with itself through various displacements. Autocorrelation function comparison is inherently registration invariant and, consequently, is insensitive to either vertical or horizontal misregistration of the specimen or character to be identified, thereby allowing identification to take place while the document containing the character is in motion. Furthermore, the identification of an imperfect specimen or character is not hampered when autocorrelation functions of the specimens, rather than the specimens themselves, are used in the comparison.

The primary object of this invention is to provide specimen identification apparatus utilizing autocorrelation function comparison wherein the autocorrelation function of a specimen to be identified is electrooptically generated.

Another important object of this invention is to provide specimen identification apparatus utilizing the autocorrelation function of a specimen wherein ambient light is eliminated from the autocorrelation function.

A further object of this invention is to provide specimen identification apparatus utilizing autocorrelation functions wherein an optical autocorrelation function of a specimen to be identified is electrooptically generated with the elimination of ambient light, and the specimen autocorrelation function is then compared optically with a plurality of reference autocorrelation functions to identify the specimen.

A further object is to provide apparatus for generating an electrical signal indicative of each of the foregoing optical comparisons, and means for automatically recognizing or identifying the electrical signal representing the closest comparison or match.

Other objects of the invention will be pointed out in the following description and claims and illustrated in the accompanying drawings which disclose, by way of example, the principle of the invention and the best mode which has been contemplated of applying that principle.

In the drawings:

FIG. 2 shows a specific scanning system which may be used in the apparatus of FIG. 1;

Figure 1:
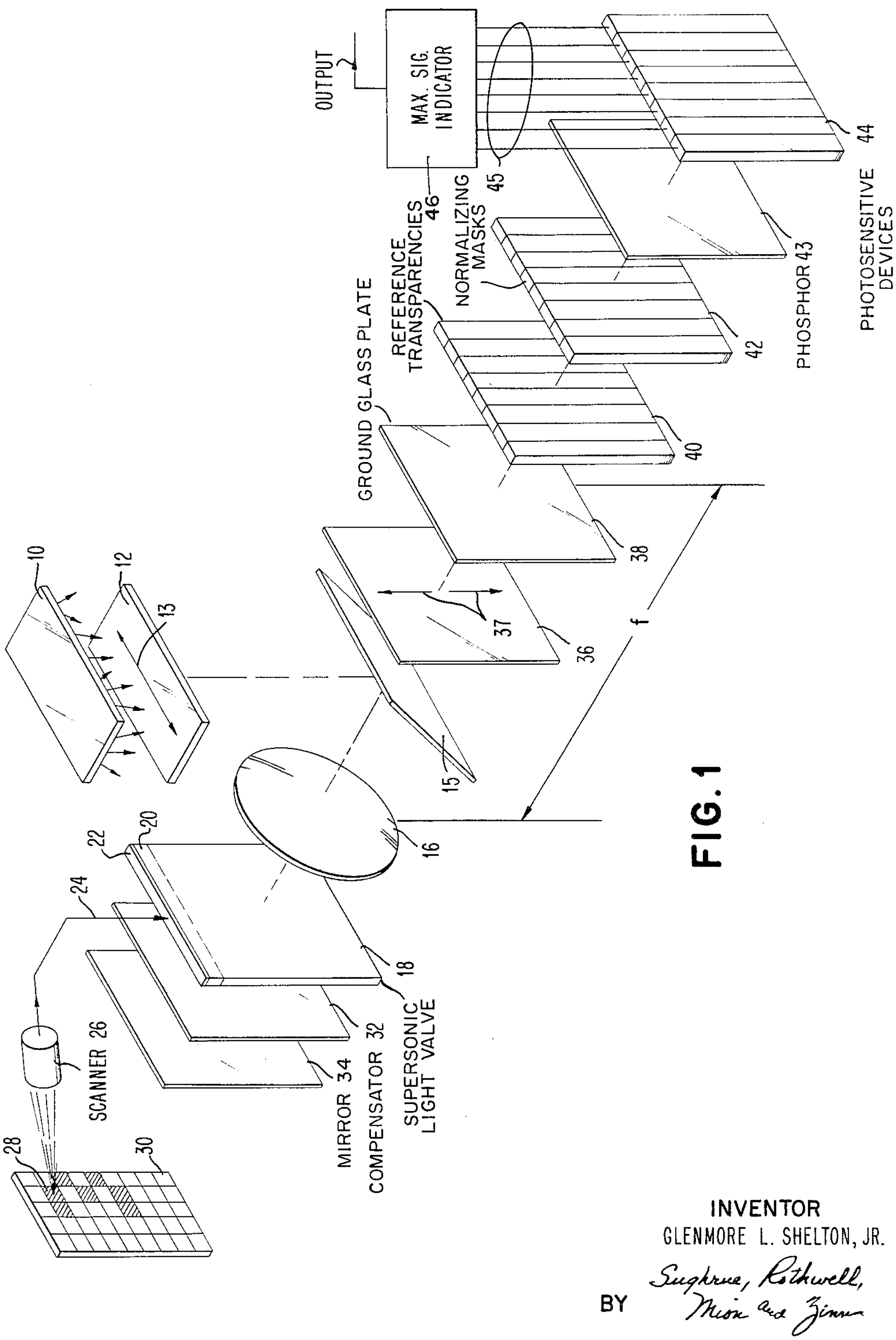
FIG. 1 shows a preferred embodiment of a specimen identification apparatus incorporating this invention.
Figure 4:
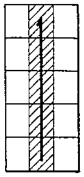
Figure 5:
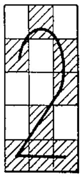
Figure 6:
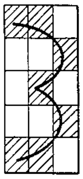
Figure 7:
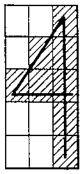
Figure 8:
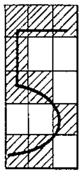
Figure 9:
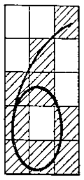
Figure 10:
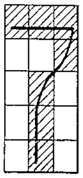
Figure 11:
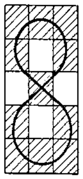
Figure 12:
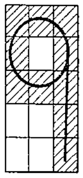
Figure 13:
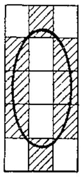
Figure 14:
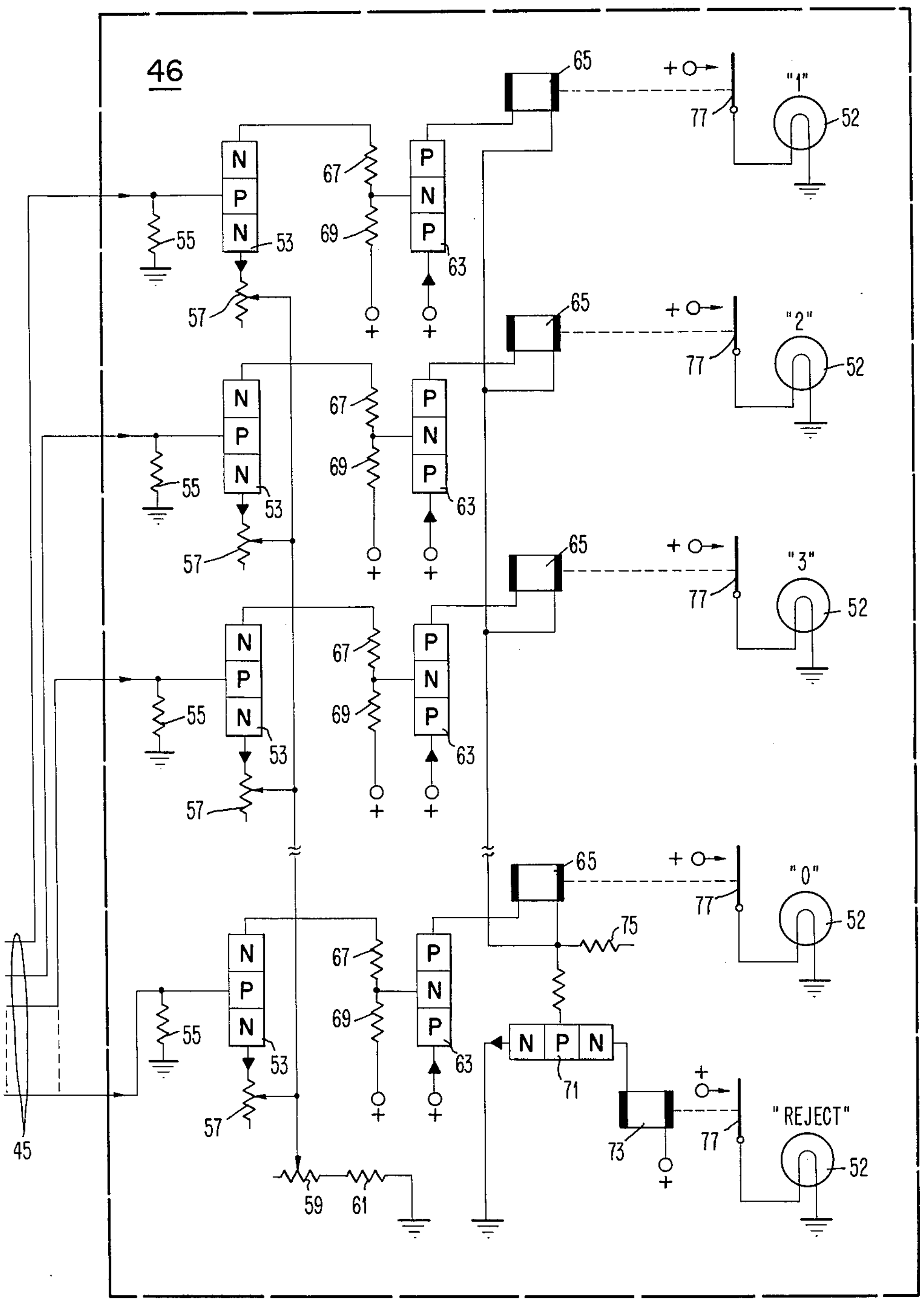
Figures 15, 16:
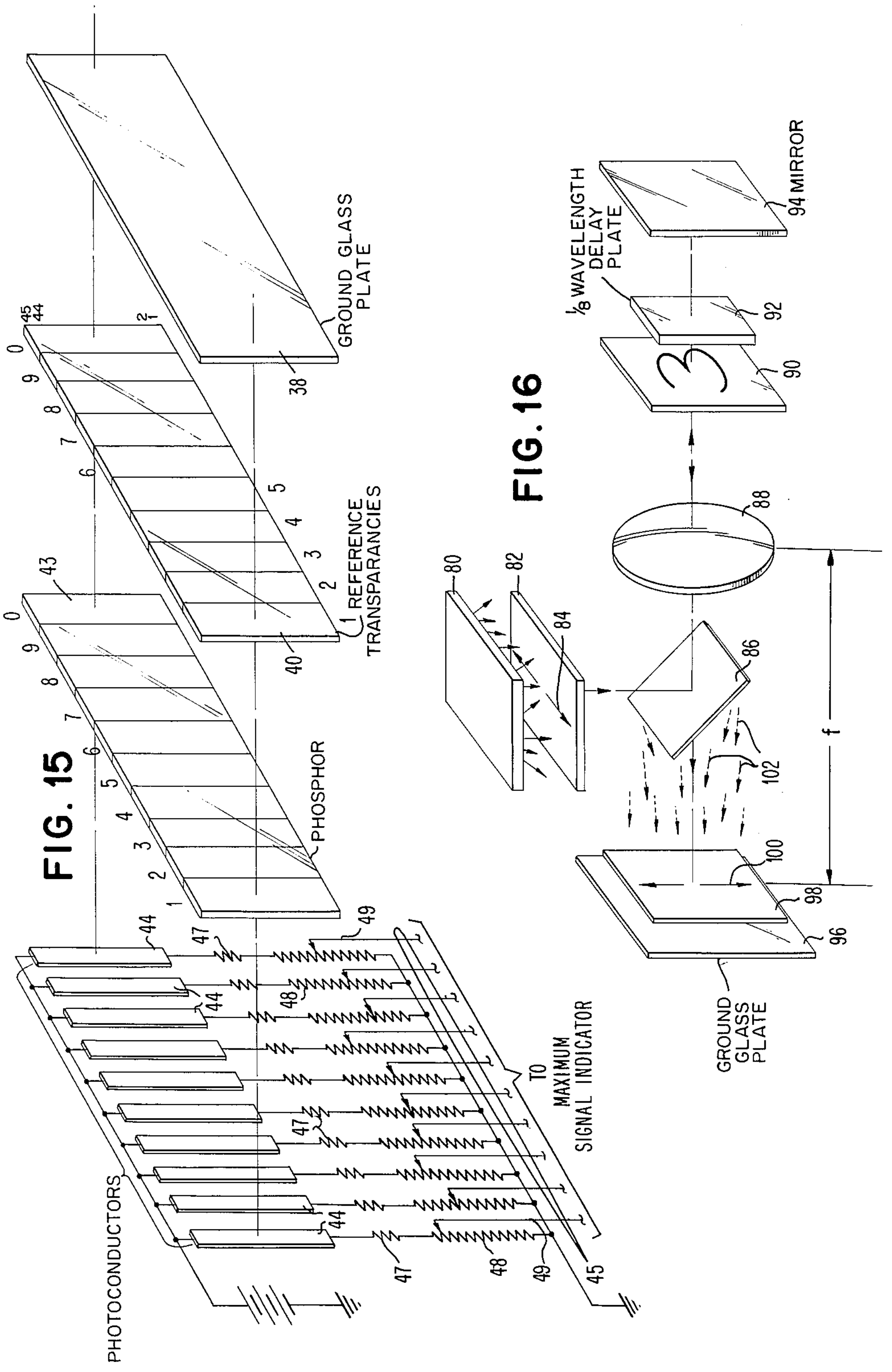

FIG. 3*a* shows a complete autocorrelation chart for a numeral "3";

FIG. 3*b* shows a corresponding reference transparency for a numeral "3";

FIGS. 4–13 show actual and normalized autocorrelation charts for the ten digits;

FIG. 14 shows a particular maximum signal indicator which may be used in the apparatus of FIG. 1;

FIG. 15 shows a particular arrangement for providing normalization of autocorrelation functions; and FIG. 16 shows another embodiment of specimen identification apparatus incorporating this invention.

In accordance with the invention, an autocorrelation function of the specimen is generated electrooptically and compared optically with autocorrelation functions of reference patterns to provide an indication of the identity of the specimen. The autocorrelation function is a measure of the correlation of a function with itself and is thus inherently registration invariant. If the specimen to be identified is considered to be a matrix of discrete areas having coordinates $(x, y)$ that are predominantly black or predominantly white, then depending upon the positions of the lines that the specimen comprises, there is a function $f(x, y)$ that is "1" for each instance where the area about the coordinates $(x, y)$ is black and "0" where white. The autocorrelation function defines the number of pairs of black areas separated by a given distance in a given direction, over all distances and directions. If $(x, y)$ is a point on the pattern, and $(x+x', y+y')$ is another point on the pattern separated from the point $(x, y)$ by $(x', y')$, then the product $$(x, y)(x+x', y+y')=1$$

only where both points are black. Since this procedure is performed on every pair of points in the pattern, the autocorrelation function $D(x', y')$ is defined as:

$$D(x', y')=\sum_{x,y} f(x, y)f(x+x', y+y')$$

The autocorrelation function $D_S(x', y')$ of the specimen S is then optically compared, point-by-point, with the autocorrelation functions $Z_R(x', y')$ of all reference patterns R, where $Z_{Rn}(x', y')$ of reference pattern $R_n$ is defined as:

$$Z_{Rn}(x', y')=\frac{D_{Rn}(x', y')}{\left[\sum_{x',y'} D^2_{Rn}(x', y')\right]^{1/2}}$$

The comparison $S_S$, $R_n$ of $D_S(x', y')$ and $Z_{Rn}(x', y')$ is effected as follows:

$$S_{S,\,Rn}=\sum_{x',y'} D_S(x', y')\cdot Z_{Rn}(x', y')$$

The reference pattern R*n* that produces the largest comparison sum determines the identification of the specimen. Either each comparison sum or the reference pattern autocorrelation function itself must be normalized to guarantee that the largest sum will be indicative of the reference pattern that is most similar to the specimen. A Schwartz inequality, as found on page 417 of a text authored by Wilfred Kaplan, entitled Advanced Calculus, 1952, published by Addison-Wesley Publishing Co., may be used to show that, $$\sum_{x',y'} \frac{D_S(x', y')\cdot D_{Rn}(x', y')}{\left[\sum_{x',y'} D^2_{Rn}(x', y')\right]^{1/2}}$$

is a maximum when $D_S(x', y')=D_{Rn}(x', y')$.

In FIG. 1 there is shown a preferred embodiment of specimen identification apparatus incorporating an electrooptical autocorrelation function generator which is an improvement of the entirely optical autocorrelation generator described in an article by Leslie S. G. Kovasznay and Ali Arman published in the Review of Scientific Instruments, Volume 28, No. 10, October 1957, pages 793–

797. In that article, the specimen autocorrelation is obtained optically by the use of a transparency containing a specimen. Such an optical autocorrelation system is also discussed in the co-pending Horwitz and Shelton application, Serial No. 45,034, filed July 25, 1960, and assigned to the same assignee as this application. However, in the improved apparatus of this invention, an optical specimen autocorrelation function is generated electrooptically, thereby eliminating the need of a specimen transparency, and furthermore, ambient light is removed from the autocorrelation function.

The preferred apparatus consists of an elongated source 10 of polychromatic (incoherent) light which is directed through a first polarizer 12, such as a film, to plane polarize the light in a first plane indicated by the double-headed arrow 13. The plane polarized light 14 then impinges upon a half-silvered mirror 15 which acts as a beam splitter and reflects part of the plane polarized light horizontally to the left through a collimating lens 16 to the face of a supersonic light valve or delay line 18, which may be made of fused silica, for example. Bonded to the upper end of light valve 18 is a piezoelectric crystal 20 having suitably secured thereto an electrode 22. Connected to electrode 22 is an electrical conductor 24 which carries the electric signals developed in a scanner 26 which scans or senses the specimen 28 to be identified or recognized. Scanner 26 may be of the flying spot type shown in FIG. 2. The two-dimensional specimen or character 28 is effectively digitized into a one-dimensional electric signal by considering the specimen, an Arabic numeral "3" in this case, to be superimposed on a 5 x 9 matrix of squares 30 with each character itself being defined by a 3 x 5 matrix. If the largest dimension of the specimen is $n$ squares, then the largest dimension of the matrix must be at least $2n-1$ squares long. In FIG. 1, $n=5$, and $2n-1=9$. The other dimension of the matrix may be the same as that of the specimen, but in order to show that this apparatus is not affected by either vertical or horizontal misregistration, matrix 30 is made five squares wide. Therefore forty-five squares must be scanned for each specimen 28.

A specific type of scanner 26 is shown in FIG. 2. A 3 x 5 specimen 28 is placed on a 5 x 9 matrix 30 and serially scanned by a flying spot scanner 50 and a phototube 52. This scanner and associated sweep circuits are fully described in Photoelectricity and Its Application, Zworykin and Ramberg, published by John Wiley, 1949, pages 369–375. Scanner 26 provides as a signal input to piezoelectric crystal 20 a series of digital pulses which correspond to squares of matrix 30 which are occupied by specimen 28. These pulses, each representing a "1," stimulate crystal 20 into vibrations which are transmitted to supersonic light valve 18. These vibrations start at the upper end of valve 18 adjacent crystal 20 and move downwardly to the bottom of the valve where they are damped out by suitable absorbing means (not shown). The vibrations take the form of a wave of horizontal lines or areas of compressions and rarefactions progressing supersonically vertically downwardly through the valve. This wave is a function of specimen 28 with each compressional area corresponding to a "1" or dark square in the matrix 30, i.e., a square occupied by the specimen. Each compressional area is actually mechanically stressed so that it exhibits birefringence. In the case of a 3 x 5 character on a 5 x 9 matrix, forty-five pulse times are required to sense each character, and therefore, the vertical dimension of light valve 18 and the pulse frequency must be so related that all forty-five horizontal waves contained in the stress pattern are present in the valve at the same time. For the purposes of this invention the stress pattern may be considered to be stationary with respect to the light passing through valve 18 because of the extremely high velocity of light as compared to the speed of the supersonic compressional wave. As pointed out previously, for a 3 x 5 character a minimum 3 x 9 matrix could be used, thereby requiring only twenty-seven pulse times for each specimen.

In discussing the manner in which the optical autocorrelation function specimen 28 is formed, we will assume that valve 18 is optically perfect and, therefore, exhibits no birefringence when it is not driven by crystal 20. Therefore, when crystal 20 is not energized by scanner 26, valve 18 is in its quiescent state and is completely transparent to light without having any effect on the phase of polarization of light passing therethrough.

The plane polarized light reflected from beam splitter 15 is collimated by lens 16 and passes through valve 18 containing the compressional wave representing the digital function of specimen 28. Each band of compression in valve 18 rotates the plane of polarization of the plane polarized light through an angle proportional to the amplitude of the compressional wave, i.e., proportional to the amount of stress in an area or band of compression. The light emanating from valve 18 is directed to a mirror 34. Interposed between valve 18 and mirror 34 is a compensator 32 which is not required in the case of optically ideal valve 18. However, the function of compensator 32 is important when valve 18 is not optically perfect as will be described below.

The light is then reflected from mirror 34 back to light valve 18 where it again passes through the wave pattern of bands of compressions contained in the valve, thereby causing the polarization plane of the affected light to be rotated once again through the same angle. The rotation of the polarization plane of the plane polarized light has the effect of elliptically polarizing the light. The elliptically polarized light is then transmitted horizontally to the right through lens 16 and beam splitter 15. As explained by Kovasznay and Arman in their article, the light emanating from lens 16 is proportional to the autocorrelation function of specimen 28. However, in order to detect this autocorrelation function, a frosted or ground glass plate 38 is placed in the focal plane of lens 16, the focal length of lens 16 being equal to $f$, and an analyzer 36 is placed between lens 16 and the plate 38. In the special case when the angle of rotation is 45° so that the light is rotated a total of 90° after two passes through the valve, the light is then circularly polarized. A total angle of 180° or multiples thereof is to be avoided since the light would then be once again plane polarized in plane 13, thereby being absorbed by analyzer 36 and blocked from ground glass plate 38. In other words, the intensity of the compressional wave should not be such that it rotates the light exactly through an angle of 90° or even multiples thereof Analyzer 36 is a film-like polarizer 12 but with its optical axis normal thereto. With such an arrangement, the plane polarized light transmitted by polarizer 12 is absorbed by analyzer 36 unless the plane of polarization thereof has been rotated, i.e., the light elliptically or circularly polarized by the compressional wave in valve 18. Without analyzer 36, the optical autocorrelation function contained in the light transmitted by lens 16 could not be visibly detected. However, analyzer 36 has the effect of converting the elliptical polarization caused by valve 18 into a light beam whose intensity is modulated in accordance with the amount of rotation caused by valve 18.

Consequently, the light beam transmitted by analyzer 36 forms on plate 38 an image which is a pattern of vertically spaced horizontal light bands varying in intensity in accordance with the autocorrelation function of the specimen. For the specimen 28 on a matrix 30 as shown in FIG. 1, the image is forty-five horizontal lines or areas vertically spaced on plate 38. The intensity of the light forming these lines is proportional to the autocorrelation function of specimen 28. Therefore, in view of the previous discussion of the mathematics explaining the autocorrelation function, it can be seen that the light beam transmitted through valve 18, lens 16 and analyzer 36 and then focused on plate 38 represents the autocorrelation function of the specimen 28 subject to integration.

As mentioned previously, analyzer 36 is rotated so that its optical axis is normal to the optical axis of polarizer 12. In such an arrangement, analyzer 36 blocks light vibrating in plane 13 of the plane polarized light transmitted by polarizer 12 and passes only light having a component vibrating in the plane indicated by the double-headed arrow 37. Consequently, back scattered plane polarized light reflected directly from beam splitter 15 to the right is absorbed by analyzer 36, thereby eliminating ambient light from plate 38 to provide better optical contrast. However, elliptically polarized light produced by the compressional wave in valve 18 contains a component vibrating in plane 37. This component passes through analyzer 36 and impinges upon plate 38 to produce an image thereon of the autocorrelation function of specimen 28 subject to integration. Furthermore, any light from polarizer 12 which should happen to fall directly on analyzer 36 would be absorbed in the same manner as the back scattered light. There is still another form of ambient light eliminated by the apparatus in FIG. 1. When there is no signal input to valve 18 from piezoelectric crystal 20, valve 18 is completely transparent to light in the ideal case so that light reflected from mirror 34 is still plane polarized in plane 13 when it reaches analyzer 36 and is absorbed thereby. Consequently, when valve 18 is in its quiescent state, i.e., no electric signal is applied to piezoelectric crystal 20 and plate 38 is dark.

However, as a practical matter, most supersonic light valves exhibit some inherent birefringence even in their quiescent state. Therefore, even when crystal 20 is unenergized, plane polarized light transmitted by polarizer 12 will be rotated slightly by valve 18 due to its inherent birefringence, thereby causing slightly elliptically polarized light to impinge upon analyzer 36, and some light will be transmitted to plate 38. In order to eliminate this condition, a compensator 32 is placed between valve 18 and mirror 34. Compensator 32 may take the form of a retardation or delay plate, such as one-quarter wavelength plate, which is oriented so that its optical axis forms an angle to the light passing therethrough whereby the polarization vector is rotated to compensate for the effect of the inherent birefringence of valve 18. Compensator 32 is oriented so that the light ultimately transmitted to lens 16 from valve 18 is plane polarized in plane 13. Therefore, with proper adjustment of compensator 32, no light is transmitted to plate 38 when valve 18 is in its quiescent state.

Placed immediately behind plate 38 are a plurality of horizontally spaced, vertically extending positive transparencies 40 each containing a reference autocorrelation function. Each transparency contains forty-five horizontal bands whose degrees of light transmissibility vary according to one of the autocorrelation charts shown in FIGS. 4–13. For example, for the numeral "3," the center band has a relative transparency of 7, the two bands on either side thereof have a transparency of 2, the next two bands have a transparency of zero, etc. FIG. 3*a* shows a complete autocorrelation chart for a numeral "3." The derivation of this chart is discussed in detail in the co-pending Horwitz and Shelton application. FIG. 3*b* shows a corresponding reference transparency for a numeral "3." The numbers at the left represent the forty-five bands comprising the autocorrelation function whereas the numbers on the right represent the relative transparencies of each band. As can be seen, the relative transparencies are derived directly from the autocorrelation chart and also represent the relative intensities of the bands of light formed on plate 38 when the specimen being scanned is a numeral "3." The charts in FIGS. 4–13 show only one-half of each autocorrelation function since each function is symmetrical about its center point as shown in FIG. 3*a* for the numeral "3."

The supersonic light valve or delay line 18 is made of a material such as fused silica, in which the angle of polarization of the material is proportional to its density. Therefore, as the compressional wave induced by the piezoelectric crystal propagates downwardly through the valve 18, the plane polarized light impinging thereon is rotated through an angle proportional to the intensity of the compressional wave at each horizontal segment of the valve. When a specimen is being scanned, only two intensities of compression are produced in valve 18. One intensity corresponding to a signal of "1" and another for a signal of "0." The "0" signal may be considered as producing zero compression in valve 18, and therefore one compression band or area is produced every time a black or occupied square of specimen 28 is scanned. All compression waves are of the same amplitude and, therefore, rotate the plane of the polarized light through the same angle.

As previously stated, the optical autocorrelation function appearing on plate 38 consists of a plurality of vertically spaced, horizontally extending lines of light of varying intensity, the intensity being proportional to the autocorrelation function of specimen 28. A shown by the autocorrelation functions in FIGS. 3–13, the center horizontal line of the autocorrelation function has the greatest light intensity, and the intensities of the lines on either side thereof have a lesser intensity but are symmetrical with respect to the center line. Furthermore, the relative intensity of the center line is always equal to the total number of matrix segments or squares occupied by specimen 28. For example, in the case of a numeral "3," since it occupies seven squares of matrix 30, the central line of its autocorrelation function displayed on plate 38 will have a relative intensity of seven.

Placed immediately behind transparencies 40 are normalizing masks 42 having various degrees of gray or opacity to assure that the matching transparency transmits the greatest amount of light. The relative opacities of masks 42 are obtained as explained in the aforementioned co-pending Horwitz and Shelton application. Mounted behind masks 42 is a light collecting or integrating device such as a light storing phosphor sheet 43. A plurality of photocells 44 or other photosensitive devices are mounted immediately behind the phosphor sheet, one photocell being opposite each of the transparencies 40. Each photocell produces a signal proportional to the stored light contained in its corresponding section of phosphor 43. Such a signal is also proportional to the autocorrelation function. As was previously explained mathematically, the photocell behind the reference transparency which most nearly matches the specimen autocorrelation function produces the largest of the electrical output signals appearing on the photocell output conductors 45. These photocell output signals are all applied to a maximum signal indicator 46 which functions to provide an output signal which immediately identifies which one of the conductors 45 carries the largest electrical signal, thereby identifying specimen 28. There is shown in FIG. 14 a specific maximum signal indicator which is suitable for use with the specimen identification apparatus shown in FIG. 1.

The normalization of the autocorrelation matching or comparing function may also be accomplished by use of a plurality of suitably adjusted voltage dividers connected in the photocell circuits as shown in FIG. 15. The elliptically polarized light from lens 16 forms an image of the specimen autocorrelation function on plate 38 for comparison thereof with positive reference transparencies 40. Each transparency represents one of the numerals 1, 2 . . . 9, 0 and contains forty-five horizontal bands. Each band has a relative light transmissibility proportional to the appropriate position in the corresponding autocorrelation chart. The autocorrelation charts are shown in FIGS. 4–13 with only one-half of the positions filled since the charts are symmertical as shown in FIG. 3*a* for the numeral "3."

Light from the images on plate 38 is stored in phosphor sheet 43. Immediately behind phosphor sheet 43 are ten photoconductors 44, each of which receives the stored light from one vertical portion of the phosphor and produces an electric current proportional to the stored light. The largest electric current should be derived from the photocell associated with the reference transparency matching the specimen autocorrelation function. However, in order to assure this relationship the light passing through the transparencies must be normalized. For example, the optical autocorrelation function of a specimen numeral "8" would cause more light to be transmitted through the reference transparency of the autocorrelation function of the numeral "3" than a specimen numeral "3" would. The manually generated actual and normalized autocorrelation functions are derived in the aforementioned co-pending Horwitz and Shelton application and are reproduced here in FIGS. 4–13. From a comparison of the actual and normalized functions, it can be seen that each normalized function has been reduced to a percentage of the actual function. This relationship for the ten digits, 1, 2, . . . 9, 0 as shown below with the normalized function being indicated as a percentage of the actual autocorrelation function for each digit:

| Digit: | Normalized autocorrelation function (percent) |
|---|---|
| 1 | 11 |
| 2 | 7.7 |
| 3 | 9.1 |
| 4 | 6.9 |
| 5 | 6.5 |
| 6 | 6.2 |
| 7 | 9.1 |
| 8 | 4.7 |
| 9 | 5.0 |
| 0 | 7.2 |

These relationships may then be used to normalize the electrical currents produced by photocells 44. Connected in the output circuits of photocells 44 are voltage dividers each comprising a fixed resistor 47 and a variable resistor 48 having a movable tap 49. Each fixed resistor is chosen to drop 89% of the voltage developed across each voltage divider and each tap 49 is then set to further drop the voltage to a point where the voltage at the tap is the same percentage of the total drop across the voltage divider as the percentage listed above. For example, the tap 49 for the digit "1" will be set so that it picks off 11% of the total voltage drop, i.e., the tap will be in its zero position. However, the digit "8" will be set at its 4.2 position so that it picks off 4.2% of the total voltage drop. The voltages appearing at taps 49 are then applied to conductors 45 which are connected to the input of the maximum signal indicator 46.

A specific type of maximum signal indicator 46 is shown in FIG. 22*k* of co-pending Horwitz and Shelton application Serial No. 93,070, filed March 3, 1961, and assigned to the same assignee as the instant application. This indicator, reproduced here as FIG. 14, accepts the analog voltages present on output leads 45 of photoconductors 44 and causes an output indicator lamp 52 to be lighted as an indication of the indentity of specimen 28. One of the indicator lamps 52 functions as a reject indicator and is lighted if the largest input signal is not sufficiently greater than the second largest signal.

The input signals are applied to the base connections of a group of NPN type transistors 53. Each transistor base circuit includes a resistor 55 to protect the transistor in the case of a disconnected input signal. The emitter-base connection of the transistors provides a diode action that, in conjunction with resistors 57 and a common path for current including resistors 59 and 61, permits current flow only to the transistor base to which the most positive signal is applied. The voltage drop across resistors 59 and 61 back basis the transistors 53 associated with the less positive input signals, thereby preventing current flow in their base circuits. The sensitivity of the circuit is defined as the amount by which the most positive input signal must exceed the adjacent signal (second most positive signal) to back bias the transistor associated with the latter signal. The sensitivity is controlled by the setting of resistor 59. Resistors 57 are adjusted to provide a constant and equal emitter resistance for all of the transistors 53 regardless of the setting of resistor 59. As the common resistance in the emitter circuits is varied by a change in the setting of resistor 59, the settings of resistors 57 are changed in the opposite direction to maintain a constant total emitter resistance. Resistors 57 may be controlled simultaneously with control of resistor 59 by the use of a common control shaft. The minimum common resistance in the emitter circuit is determined by the fixed resistor 61. If the resistance of resistor 61 is labeled $R_{61}$, the active resistance of resistor 59 is labeled $R_{59}$, the active resistance of resistor 57 is labeled $R_{57}$ and the emitter base resistance of a transistor 53 is labeled $R_{53}$, then the smallest ratio between the amplitudes of the most positive signal $E_i$ and the adjacent signal $E_j$ that may be tolerated without indicating a reject is approximately:

$$\frac{R_{53}+R_{57}+R_{59}+R_{61}}{R_{59}+R_{61}}$$

Only the transistor 53 associated with the most positive input signal is permitted to conduct if the most positive signal exceeds the adjacent signal by an amount greater than the sensitivity of the system.

The output of the conducting transistor 53 is applied to an associated PNP transistor switch 63 which, in turn, provides current to operate a relay 65 associated with the largest input signal. A group of resistors 67 provide protection for transistors 53 and 63. A second group of resistors 69 provide paths for leakage current in the base circuits of transistors 63.

A reject circuit containing a transistor 71 and the reject relay 73 operates when the largest two or more applied signals are approximately equal. This condition causes two or more relays 65 to operate. Transistor 71 is ordinarily non-conducting due to the negative voltage at its base (which is equal to the supply voltage applied to a resistor 75 less the voltage drop across the resistor). When two or more relays 65 are operated simultaneously, a sufficient current flows in resistor 75 to provide to the base of transistor 71 a voltage which is sufficiently high to render the transistor conducting and operate relay 73. Each relay has contacts 77 which control the operation of an indicator 52.

There is shown in FIG. 16 another embodiment of this invention wherein ambient light is eliminated from the optical autocorrelation function. The optical autocorrelator of this embodiment is the same as that disclosed by Kovaszny and Arman and shown in the aforementioned co-pending Horwitz and Shelton application Ser. No. 45,034. A light source 80 directs incoherent polychromatic light through a first polarizer 82 which transmits plane polarized light which is polarized in a plane indicated by the double-headed arrow 84. This plane polarized incoherent light is then directed to a half-silvered mirror 86 which acts as a beam splitter to transmit a portion of the light horizontally to the right through a collimating lens 88. As disclosed in the aforementioned co-pending Horwitz and Shelton application, a transparency 90 containing a specimen is placed in the path of the light transmitted by lens 88. The light passing through the transparency is then transmitted through a one-eighth wavelength delay or retardation plate 92 and reflected from a mirror 94 horizontally to the left back through plate 92, transparency 90, lens 88 and beam splitter 86 to a ground glass plate 96 placed in the focal plane of lens 88. However, placed between plate 96 and beam splitter 86 is a second polarizer 98 which polarizes light in a plane 100 which is normal to plane 84. Therefore, polarizer 98 acts as an analyzer with respect to polarizer 82 and both polarizers may be films properly oriented. Delay plate 92 may introduce other than a one-quarter wavelength delay in the polarized light passing therethrough. However, for any other delay, the light becomes only elliptically polarized, and the resulting intensity of the image on plate 96 is less than when the light is circularly polarized.

The interaction of polarizer 82, delay plate 92 and polarizer 98 to eliminate the ambient light from plate 96 will now be explained. Without the presence of these elements, an optical autocorrelation function will be formed on plate 96 as described by Kovaszny and Arman. However, back scattered light 102 from beam splitter 86 causes ambient light to fall upon plate 96 thereby raising the ambient light level and reducing the contrast of the autocorrelation function displayed on the plate. This ambient light may be eliminated from plate 96 by means of the arrangement shown in FIG. 16. The plane polarized light transmitted by polarizer 82 which takes the form of back scattered light 102 is still polarized in plane 84. However, since polarizer 98 transmits only light which is polarized in a plane 100 normal to plane 84, none of the back scattered light 102 is transmitted through polarizer 98, but on the contrary is absorbed thereby. Therefore, all ambient light due to the back scattered light 102 is eliminated from plate 96.

However, some means must be provided by which the desired optical autocorrelation function image is allowed to pass through polarizer 98 and be displayed on plate 96. Such a result is accomplished by the incorporation of the one-eighth wave delay plate 92 placed between transparency 90 and mirror 94. When the optic axis of delay plate 92 is properly oriented with respect to the plane of polarization of the plane polarized light passing through transparency 90 and reflected from mirror 94, the total effect of the delay plate 92 on the light passing twice therethrough is that of a one-quarter wavelength plate. Consequently, the light transmitted through plate 92 horizontally to the left is circularly polarized and, therefore, will pass through polarizer 98 to allow an image of the autocorrelation function pattern to be formed on plate 96. The remainder of the specimen identification apparatus is not shown in FIG. 16, but it is to be understood that, as shown in FIG. 1, placed behind plate 96 there are normalized reference transparencies, a phosphor sheet, photoconductive light detectors and a maximum signal indicator.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. Specimen identification apparatus including a source of plane polarized light polarized in a first plane, said apparatus comprising; means for forming from said plane polarized light an elliptically polarized optical autocorrelation function of the configuration of a specimen to be identified, analyzer means oriented to block light vibrating in said first plane, whereby said plane polarized light is blocked by said analyzer means and said elliptically polarized autocorrelation function is transmitted through said analyzer means, and means for comparing said optical autocorrelation function with a reference optical autocorrelation function to determine whether the specimen matches the reference.

2. Specimen identification apparatus as defined in claim 1 wherein said forming means includes a supersonic light valve containing a compressional wave representative of said specimen.

3. Specimen identification apparatus as defined in claim 1 wherein said forming means includes a mask containing a transparency of said specimen and an optical delay plate.

4. Specimen identification apparatus comprising a supersonic light valve, means for driving said valve in accordance with a signal corresponding to a function of the configuration of a specimen to be identified, a light source, means for plane polarizing in a first plane the light emanating from said source, means for directing said light through said valve to produce a light beam which is elliptically polarized in accordance with an autocorrelation function of said specimen, means for eliminating from said light beam any light vibrating in said first plane and transmitting light containing said autocorrelation function, means for imaging said light beam, and means for comparing the image with reference patterns to determine the identity of the specimen.

5. Specimen identification apparatus including a source of incoherent light, first polarizing means to plane polarize said incoherent light in a first plane, a supersonic light valve, means to drive said valve in accordance with a function of the configuration of a specimen to be identified, said driving means producing in said valve a supersonic wave corresponding to said function, said wave having areas of compression which have the effect of rotating through a predetermined angle the plane of polarization of said plane polarized light passing therethrough, said angle being other than an even multiple of 90°, means for reflecting the rotated light back through said valve to rotate said light again through said predetermined angle in the same direction to produce elliptically polarized light proportional to the autocorrelation function of said specimen, an analyzer disposed in the path of said elliptically polarized light and arranged to block light vibrating in said first plane, the resultant light transmitted by said analyzer thereby being proportional to the autocorrelation function of said specimen, means for forming an image of said resultant light, and means for comparing said image with a plurality of reference autocorrelation functions to determine the identity of said specimen.

6. Specimen identification apparatus as defined in claim 5 wherein said predetermined angle is 45° and said elliptically polarized light is circularly polarized.

7. Specimen identification apparatus as defined in claim 5 further including an adjustable birefringent device disposed between said valve and said reflecting means, said birefringent device being adjusted to compensate for any rotation caused by said valve when it is not driven so that no light is transmitted through said analyzer when said valve is not driven.

8. Specimen identification apparatus as defined in claim 5 wherein said image forming means includes a ground glass plate for developing an image of said specimen autocorrelation function, and further comprising a plurality of reference autocorrelation function masks adjacent said plate, light integrating means adjacent said masks, and photoelectric comparison means adjacent said integrating means for identifying the mask which most closely matches said specimen autocorrelation function.

9. Specimen identification apparatus as defined in claim 8 wherein said photoelectric comparison means includes a photoconductor associated with each reference mask, an adjustable current regulating means in circuit with each photoconductor to normalize the output current thereof so that the largest output current is associated with the mask most closely matching said specimen autocorrelation function, and maximum signal indicating means for identifying the photoconductor having the largest output current.

10. Specimen identification apparatus comprising means to produce an incoherent light beam, first polarizing means disposed in the first plane, a half-silvered mirror disposed in an optical path located at right angles to said light beam to reflect a portion of said plane polarized light in a first direction along said optical path, a collimating lens disposed in said optical path to receive the reflected light from said mirror, a supersonic light valve in said optical path to receive the light from said lens, a piezoelectric crystal fixed to said valve, means to energize said crystal in accordance with a function of the configuration of a specimen to be identified, thereby inducing in said valve a compressional wave including areas of compressions corresponding to said function, said areas of compression exhibiting birefringence which has the effect of rotating through a predetermined angle the plane of polarization of the plane polarized light passing therethrough, said angle being other than an even multiple of 90°, means for reflecting the rotated light in the opposite direction along said optical path back through said valve and said lens, said compressional wave again rotating said light through said predetermined angle to produce elliptically polarized light, an analyzer in said optical path for receiving the elliptically polarized light from said lens and oriented to plane polarize light in a second plane normal to said first plane whereby the intensity of the light beam passing through said analyzer is proportional to the autocorrelation function of said specimen, means to form an image of said light beam, and means to compare said image with a plurality of reference patterns to determine the identity of said specimen.

11. Specimen identification apparatus as defined in claim 10 wherein said valve has an inherent birefringence which is present when said crystal is not energized, thereby causing an inherent rotation of plane polarized light passing therethrough, and said apparatus further comprising a crystal disposed between said valve and said reflecting means to rotate the light transmitted by said valve through an angle sufficient to cause said analyzer to block all light impinging thereupon when there is no compressional wave induced in said valve by said crystal.

12. Specimen identification apparatus comprising a source of plane polarized light polarized in a first plane, a lens, optical means containing a specimen to be identified, the light transmissibilty of said optical means varying in accordance with the configuration of said specimen, light reflecting means, said lens, said optical means, and said reflecting means all being arranged successively along an optical path, means to direct said light through said lens in one direction along said optical path to said reflecting means so that said light is reflected in the opposite direction along said optical path back through said optical means and said lens thereby forming an optical autocorrelation function of the configuration of said specimen, means disposed between said directing means and said mirror for rotating the plane of polarization of said plane polarized light to elliptically polarize said light, an analyzer in the path of the elliptically polarized light transmitted by said lens in said opposite direction, said analyzer being so oriented that it blocks said plane polarized light but passes said elliptically polarized light, image forming means located along said optical path in the focal plane of said lens so that an image of the optical autocorrelation function of said specimen is focused on said image forming means, and means to compare said image with a plurality of reference patterns to determine the identity of said specimen.

13. Specimen identification apparatus as defined in claim 12 wherein said optical means is a mask containing a transparency of said specimen.

14. Specimen identification apparatus including a light source, means for plane polarizing in a first plane light emanating from said source, means for forming from said plane polarized light an elliptically polarized optical autocorrelation function of the configuration of a specimen to be identified, analyzer means oriented to block light vibrating in said first plane, an image forming means for displaying an image of said optical autocorrelation function, whereby ambient light from said light source and plane polarized light from said polarizing means is blocked by said analyzer means from said image forming means and said elliptically polarized autocorrelation function is transmitted through said analyzer means to said image forming means, and means for comparing said image with a plurality of reference patterns to determine the identity of said specimen.

References Cited by the Examiner

UNITED STATES PATENTS

| | | | |
|---|---|---|---|
| 3,064,519 | 11/1962 | Shelton | 88—1 |
| 3,067,413 | 12/1962 | Fischle et al. | 88—61 X |

OTHER REFERENCES

Horwitz et al.: "Pattern Recognition Using Autocorrelation," Proceedings of the IRE, vol. 49, January 1961, pp. 175–185.

JEWELL H. PEDERSEN, *Primary Examiner.*